(12) United States Patent
Hill

(10) Patent No.: US 6,206,150 B1
(45) Date of Patent: Mar. 27, 2001

(54) COMPOSITE BRAKE DRUM HAVING A BALANCING SKIRT

(75) Inventor: Ross S. Hill, Lansing, MI (US)

(73) Assignee: Hayes Lemmerz International Inc., Northville, MI (US)

( * ) Notice: Subject to any disclaimer, the term of this patent is extended or adjusted under 35 U.S.C. 154(b) by 0 days.

(21) Appl. No.: 09/222,511

(22) Filed: Dec. 29, 1998

(51) Int. Cl.$^7$ ................................................. F16D 65/10
(52) U.S. Cl. ..................... 188/218 R; 188/78; 188/264 R
(58) Field of Search ................... 188/218 R, 78, 188/218 A, 18 R, 264 R, 264 A, 251 R, 251 A, 251 M; 192/107 M

(56) References Cited

U.S. PATENT DOCUMENTS

| | | | |
|---|---|---|---|
| 2,493,173 | * 1/1950 | Van Halteren | 188/218 R |
| 3,841,448 | * 10/1974 | Norton, Jr. | 188/218 R |
| 4,830,150 | * 5/1989 | Denton | 188/218 R |
| 4,986,149 | 1/1991 | Carmel et al. | 188/218 R |
| 5,115,891 | * 5/1992 | Raitzer et al. | 188/218 R |
| 5,586,625 | 12/1996 | Julow et al. | 82/1.11 |
| 5,782,324 | 7/1998 | Wall | 188/218 R |
| 5,823,304 | * 10/1998 | Wagg | 188/218 R |
| 5,992,581 | * 11/1999 | Julow et al. | 188/218 R |

\* cited by examiner

Primary Examiner—Douglas C. Butler
(74) Attorney, Agent, or Firm—Marshall & Melhorn, LLC

(57) ABSTRACT

A composite brake drum for a motor vehicle or the like. The brake drum has a drum body that is comprised of a first material, preferably a cast metal, such as gray iron. The drum body has a cylindrical section, a shoulder, a mounting face, and a balancing skirt. The brake drum also includes an annular band formed from a second material, preferably a stamped metal such as steel. The annular band encircles the cylindrical section of the drum body. The balancing skirt extends from the cylindrical section and along a portion of a radially outer surface of the annular band. The steel annular band is positioned in a mold apparatus and molten iron is introduced into a mold cavity defined thereby. The mold and annular band are maintained in a static condition during the casting process. In a second embodiment, the cylindrical section and the skirt may be formed from the first material. The mounting face, the shoulder, and the annular band may be formed from the second material.

17 Claims, 3 Drawing Sheets

COMPOSITE BRAKE DRUM HAVING A BALANCING SKIRT

BACKGROUND OF THE INVENTION

The present invention relates generally to the manufacture of motor vehicle brake drums and, in particular, to composite drums having a balancing skirt.

Virtually all wheeled vehicles are provided with a brake system for selectively inhibiting the rotation of the wheels and, therefore, slowing the movement of the vehicle. To accomplish this, a typical vehicle brake system includes a friction brake assembly which is provided at one or more of the vehicle wheels. To actuate the friction brake assembly, a driver manually moves the brake pedal of the vehicle. The associated pneumatic or hydraulic actuating system, activates the friction brake assemblies to inhibit the rotation of the vehicle wheel.

Such vehicle friction brake assemblies are generally classified into two types, namely, drum brake assemblies and disc brake assemblies. A typical drum brake assembly includes a hollow cylindrical drum secured to the wheel of the vehicle for rotation therewith, and a brake shoe assembly secured to the nonrotatable components of the vehicle. The brake shoe assembly includes a pair of arced friction shoes which are operatively connected to a pneumatically or hydraulically actuated piston. The friction shoes are disposed within the hollow drum adjacent to an inner cylindrical braking surface thereof. The friction shoes are normally spaced apart from the braking surface of the drum. When the driver of the vehicle manually moves the brake pedal, the piston is actuated to move the friction shoes apart from one another into frictional engagement with the braking surface of the drum. As a result, rotation of the drum and its associated wheel are inhibited thereby slowing the vehicle.

In the past, drums of the type described above have been formed from gray iron using a conventional "as-cast" method. The "as-cast" method simply involved casting molten gray iron into the desired shape of the drum and subsequently cooling, followed by cleaning and machining when necessary. Thus, the "as-cast" method has been found to be desirable because it is a relatively simple and inexpensive method to perform. Also, gray iron has been found to be an acceptable material to use in the "as-cast" method because it provides the resultant drums with sufficient mechanical and physical properties for use in the friction-brake assemblies, such as hardness, strength, wear resistance, thermal conductivity, and the like.

Motor vehicle brake drums are often formed entirely of cast gray iron. However, while cast gray iron is the preferred material for the braking surface of the brake drum, a full cast brake drum is relatively heavy. Fully cast iron brake drums are also brittle, which can lead to heat check crack-through and breakage.

The structure and method of manufacture of such composite brake drums are known. In accordance with the conventional practice, these composite brake drums are manufactured by first forming an annular band from sheet steel stock which is then rolled to the desired configuration, typically having a radially inwardly-turned end flange and a plurality of outwardly directed strengthening ribs. In addition to providing strength, the strengthening ribs also increase the surface area to dissipate heat and improve the cooling capabilities of the brake drum.

With the annular steel band externally fixed, molten gray iron is centrifugally cast therein to form a metallurgically bonded composite brake ring. After the ring has cooled, a steel drum back is generally welded to the flange. The radially inwardly directed braking surface of the ring is then finish machined.

As part of finish machining a brake drum, the drum is balanced. This is commonly known as a "final balance." This is one of the last steps in producing the brake drum. As part of this step, the brake drum is checked for eccentric portions which will cause a brake drum to wobble during rotation. This is also known as a brake drum that is out of around or not "true."

In the case of a gray cast iron brake drum, a static balancer may be used to determine the location and amount of any eccentric portions of the brake drum. If any eccentric portion is noted, this portion may be machined to remove any eccentricity from the brake drum. This was accomplished by removing material from an outer surface of the brake drum. Known techniques have been used to remove the portion or portions from the outer surface of the brake drum.

In the case of a composite brake drum with an annular band it is not desirable to remove material from the outer surface. The machining of any outer surface of a composite brake drum with an annular band would result in removing portions of the annular band. Removing the portions of the band is counter intuitive to the benefits of increased strength and reduced weight gained by using an annular band. It is also not desirable to remove material from an inner surface because the inner surface is the braking surface.

SUMMARY OF THE INVENTION

It would be advantageous to provide an improved brake drum which includes material which is not part of an annular band that can be removed during a final balancing step. It would also be advantageous if material may be removed by known and readily available techniques.

The invention is an article of manufacturing of a composite brake drum for a motor vehicle or the like having an annular band and a balancing skirt providing a material readily removable by known balancing techniques. The drum body includes a mounting face, a shoulder, and a cylindrical section. Typically the drum body is constructed from a first material. The brake drum also includes a second material, preferably a stamped metal such as steel. The second material is used to form an annular band that acts as the outer mold of the braking surface.

A skirt formed from a first material may extend from the cylindrical section of the drum body along a portion of an radially outer surface of the annular band. The drum body along with the skirt are statically casted. Steel formed by rolling is preferably the second material.

In an alternate embodiment, the cylindrical section and the skirt are formed from the first material. The mounting face, shoulder, and annular band are formed from the second material.

This invention has the advantage of providing material which can be removed from the brake drum to eliminate any eccentric portion, while maintaining the integrity and strength of the annular band. Thus, the brake drum maintains the benefits of increased structural strength and lighter weight by maintaining the integrity of the annular band during balancing. The techniques which can be used to balance the brake drum are those commonly known in the production of composite brake drums.

BRIEF DESCRIPTION OF THE DRAWINGS

The advantages of the invention will become readily apparent to those skilled in the art from the following detailed description of the preferred embodiments when considered in the light of the accompanying drawings, in which.

DETAILED DESCRIPTION OF THE PREFERRED EMBODIMENTS

The present invention relates to a method of manufacturing and article of manufacturing of a composite brake drum for a motor vehicle or the like. It is to be understood that the specific device illustrated in the attached drawings and described in the following specification is simply an exemplary implementation of the invention defined in the appended claims. Hence, specific dimensions and other physical characteristics relating to the embodiments disclosed herein are not to be considered as limiting, unless the claims expressly state otherwise.

Figure 1:
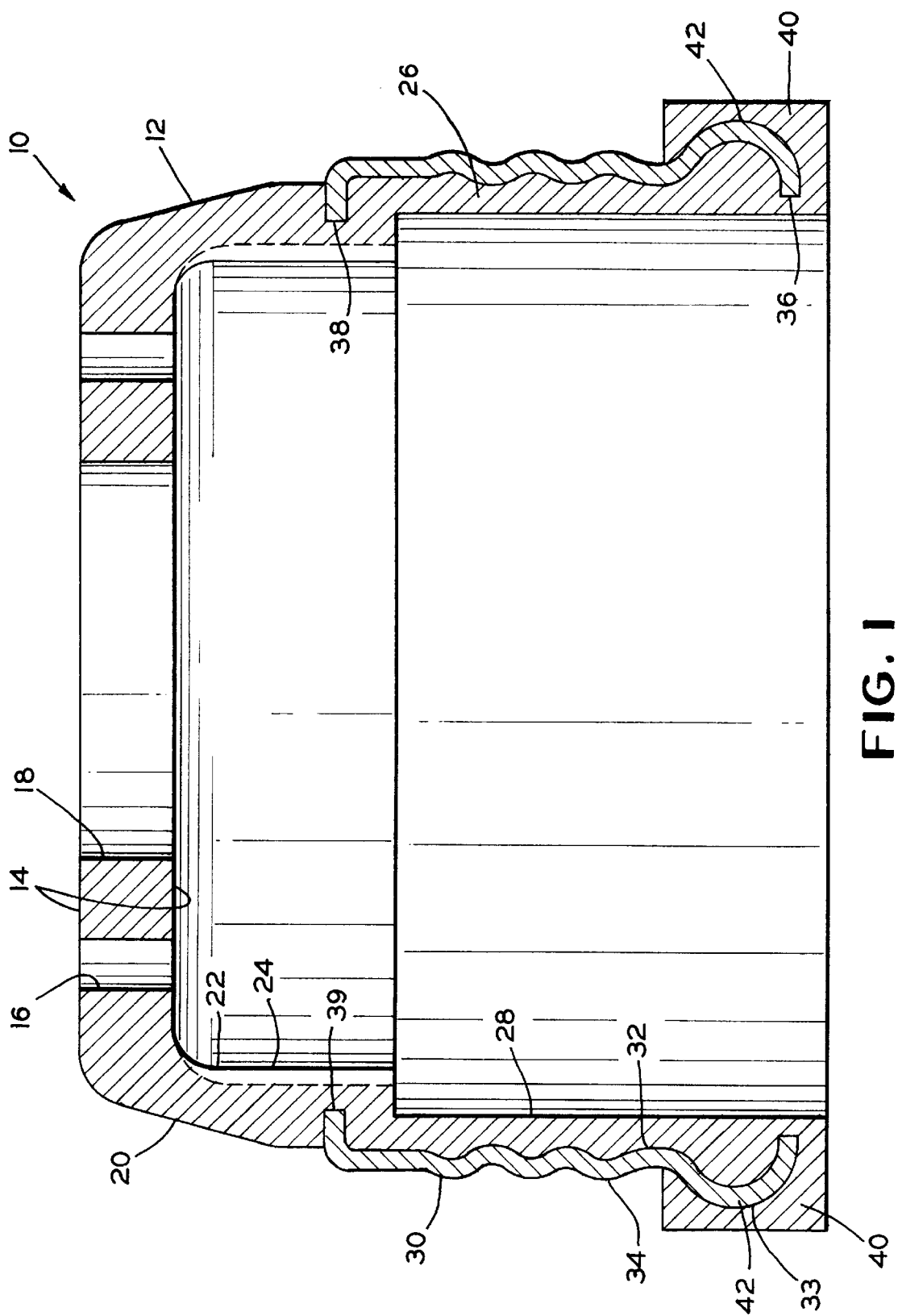
FIG. 1 is a diametrically sectioned perspective view of a full cast brake drum with an annular band in accordance with the invention.

Referring now to the drawings, there is illustrated in FIG. 1, a composite brake drum formed in accordance with the invention and generally designated by the reference numeral 10. The composite brake drum 10 includes a drum body 12, formed from a first material. Preferably the first material is gray iron. However, the present invention is not limited to the use of gray iron. Preferably, the drum body is statically casted, though other techniques for forming a drum body may be used to practice this invention. The drum body 12 is the shape of a conventional brake drum.

The drum body 12 includes mounting faces 14, constructed from the first material. The mounting faces 14 include a plurality of fastener apertures 16. The plurality of fastener apertures 16 receive studs (not shown) for mounting the brake drum 10 to a vehicle. As such, each fastener aperture 16 is aligned such that each fastener aperture 16 may receive a stud from the vehicle for mounting. The plurality of fastener apertures 16 are commonly known as bolt holes. This type of mounting is conventional. The mounting faces 14 also includes a central aperture 18. The central aperture 18 is disposed concentrically to the mounting faces 14. The function of the central aperture 18 is conventional.

The drum body 12 further includes a shoulder 20 with an inner surface 22. The shoulder 20 annularly extends from the mounting faces 14. A plurality of fins 24 may be formed or mounted on the inner surface 22. The shoulder 20, the inner surface 22, and the plurality of fins 24 are all constructed from the first material. The plurality of fins 24 move air around the inner surface 22 when the drum turns. The moving air transfers heat away from the drum 10 to cool the drum and increase it's useful life. The moving air also removes dirt and brake dust from the drum which also increases the useful life of the brake drum 10. The plurality of fins 24 is not required to practice this invention.

The plurality of fins 24 are typically straight fins. Optionally, the plurality of fins 24 may be angled. Angled fins increase the turbulence of the air flow. However if the fins are angled, the respective brake drum is limited to use on one side of a vehicle.

Alternatively, the shoulder 20 may include a plurality of fin apertures (not shown) disposed adjacent each fin 24. The plurality of fin apertures are designed to increase airflow around each fin 24. However, the plurality of fin apertures is not necessary to practice this invention.

Furthermore, the drum body 12 includes a cylindrical section 26. The cylindrical section 26 extends from the shoulder 20 and is also formed from the first material. An annular braking surface 28 is disposed on the radially inner surface of the cylindrical section 26. As stated above, movement of a vehicle is inhibited by brake shoes (not shown) pressing against the internal annular braking surface 28. This type of use and location of a braking surface is conventional.

The brake drum 10 also includes an annular band or shell 30. The annular band 30 is composed of a second material, preferably a rolled metal such as steel. The annular band 30 is disposed on the radially outer surface of the cylindrical section 26 of the drum body 12, preferably encircling it.

The annular band 30 is metallurgically bonded to the drum body 12, preferably to the shoulder 20 and to the cylindrical section 26. However, it is not required that the annular band 30 is metallurgically bonded to both the shoulder 20 and the cylindrical section 26 to practice this invention.

The use of steel as the second material as compared to an entire gray iron brake drum has several advantages. As previously stated, steel helps reduce the weight of the brake drum 10. Steel will also improve the cooling rate. Steel is a more conductive material than cast gray iron. Thus steel will more quickly dissipate heat than will gray iron. Thus brake drum 10 will cool faster.

Steel also increases the structural strength of the brake drum. Furthermore, steel also improves the shatterproof characteristic of a brake drum. Steel is more resistant to heat stress cracking than gray iron. Thus, the use of a steel annular band reduces the possibility of stress cracks in a brake drum.

The annular band 30 also includes an inner surface 32 and a radially outer surface 33. The annular band further includes an optional plurality of annular, radially outwardly directed strengthening ribs 34. The strengthening ribs 34 provide strength to the structure of a brake drum and improve the cooling efficiency of a brake drum. The strengthening ribs 34 increase the surface area of a brake drum 10. Correspondingly, a greater surface area allows more surface area for heat transfer to occur. Therefore, a brake drum with strengthening ribs can dissipate more heat than one without the strengthening ribs.

The annular band 30 includes a first peripheral edge 36 and a second peripheral edge 38. The second peripheral edge 38 includes said plurality of dovetails 39. The second peripheral edge 38 is adjacent the shoulder 20. The first peripheral edge 36 is opposite the shoulder 20.

The annular band 30 may optionally have a plurality of dovetails 39, disposed adjacent the shoulder 20. Each dovetail 39 is bonded into the shoulder 20 to improve the bonding between the band and the drum body. Optionally, each dovetail 39 may be twisted to further enhance the bond between the shoulder 20 and each of said plurality of dovetails 39. In an alternate embodiment, at least one of said plurality of dovetails 39 includes an aperture (not shown). The aperture may be used to enhance bonding between the annular band 30 and the drum body 12.

The invention is a balancing skirt 40 which extends from the cylindrical section 26. The balancing skirt 40 is constructed of a first material, the same as the cylindrical section 26. Preferably, the balancing skirt 40 is formed integrally with the cylindrical section 26.

The balancing skirt 40 encloses the first peripheral edge 36 of the annular band 30. The balancing skirt 40 extends along a portion 42 of the radially outer surface 33 of the annular band 30. The balancing skirt 40 is provided in sufficient amount such that portions of it may be removed for balancing the drum 10 without removing any segment of the annular band 30. The balancing skirt 40 may be bonded to the annular band 30, though this is not required to practice the invention.

In a preferred embodiment, the portion 42 of the annular band 30, which is covered by the balancing skirt 40, completely encircles the annular band 30. Alternatively, the portion 42 which is covered by the balancing skirt 40, intermittently encircles the annular band 30.

Figure 2:
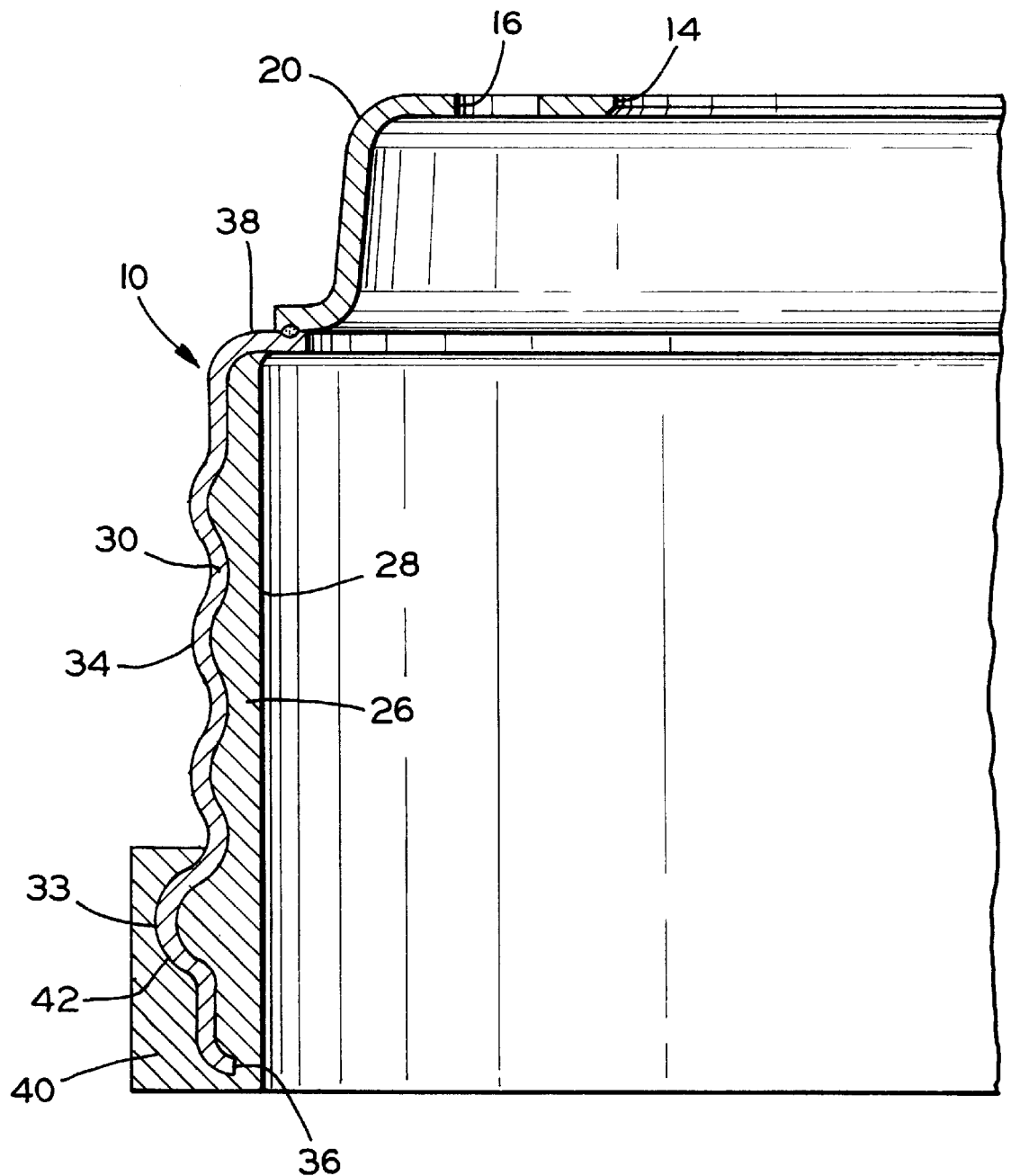
FIG. 2 is a sectional view of a two piece brake drum in accordance with the present invention.

This invention may also be applied to a two piece brake drum, as shown in FIG. 2. In a two piece brake drum, the cylindrical section 26 and the skirt 40 are formed from the first material. The mounting faces 14, the shoulder 20, and the annular band 30 are formed from the second material. In FIG. 2, the cylindrical section 26 and the skirt 40 are constructed from a first material, preferably cast gray iron. The cylindrical section 26 and the skirt 40 are typically integral. The cylindrical section 26 and the skirt 40 are in other respects the same as previously described.

In this alternative, the mounting faces 14, the shoulder 20, and the annular band 30 are all constructed from a second material, preferably steel. In this embodiment, the mounting faces 14 and the shoulder 20 may be integral or attached to the annular band 30. In this embodiment, the annular band 30 does not include the plurality of dovetails. In all other respects the mounting faces 14, the shoulder 20, and the annular band 30 are the same as previously described.

Figure 3:
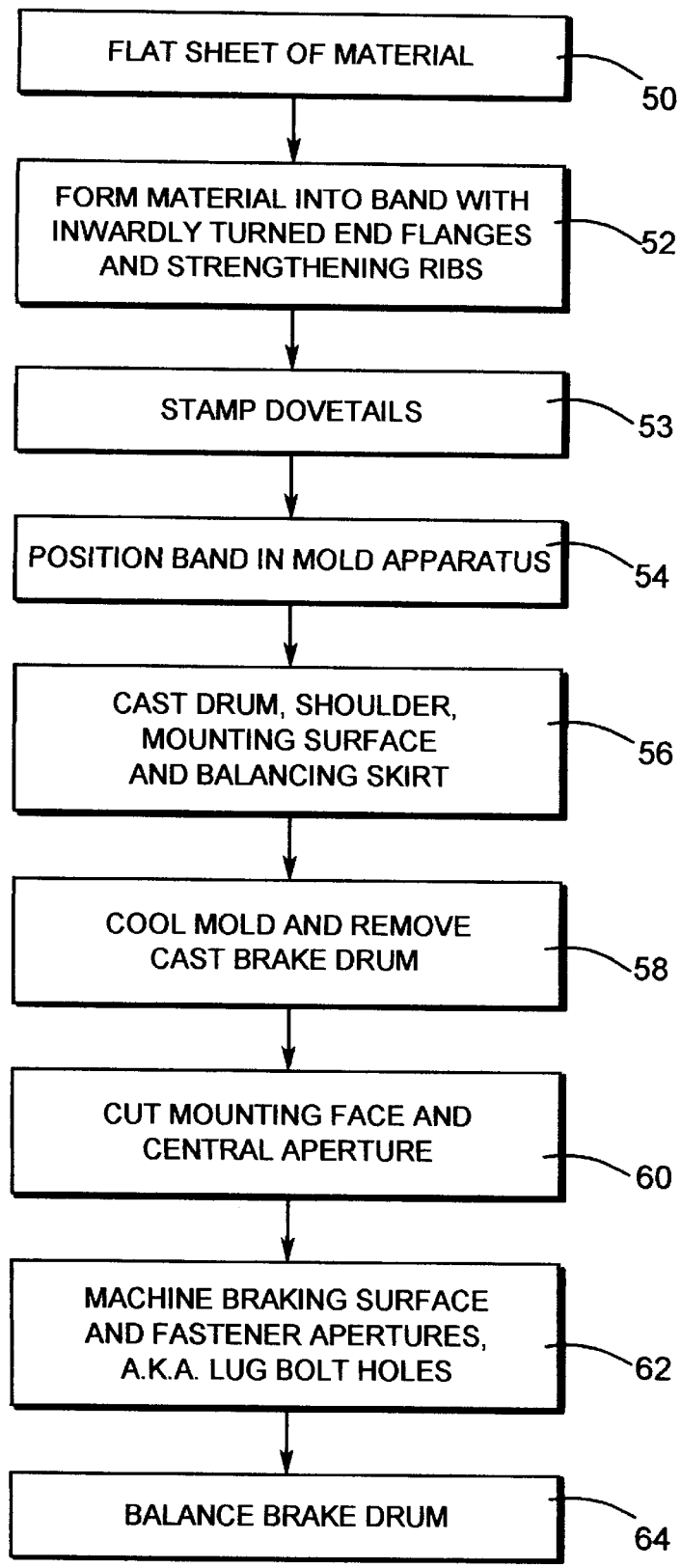
FIG. 3 is a block diagram illustrating the sequence of steps for producing the brake drum illustrated in FIG. 1.

FIG. 3 indicates the steps in the manufacture of a composite brake drum 10 in accordance with the invention of a full cast brake drum with an annular band having a balancing skirt. A flat sheet of material is provided 50. The flat sheet of material is formed 52 into the annular band 30. Optionally the flat sheet is rolled into a configuration having the first and second peripheral edges 36, 38 with the plurality of dovetails 39 and the plurality of strengthening ribs 34. The plurality of dovetails 39 are stamped 53 from the annular band 30. During stamping 53, the associated aperture may also be stamped.

A mold apparatus that allows a first material to flow around the portion 42 of the annular band 30 is provided 53. The band 30 is then positioned 54 within the mold apparatus.

Molten iron is delivered 56 to the mold apparatus. The molten iron flows into a space defined by the inner surface 32 of the annular band 30 and the surface of the mold member, filling the same. The molten iron also flows around the portion 42 of the annular band 30 to form the balancing skirt 40. In forming the balancing skirt 40, the molten iron flows axially upward along the radially outer surface 33 of the annular band 30. The molten iron also flows radially outward from the radially outer surface 33. This provides a balancing skirt 40 with sufficient thickness such that portions of the balancing skirt 40 may be removed to balance the brake drum 10 without removing any segment of the annular band 30.

Prior to the introduction of the molten iron, optionally the annular band 30 may be heated and/or fluxed (not shown) to improve the metallurgical bond between the annular band 30 and the drum body 12.

After the resulting composite brake drum 10 has sufficiently cooled, it is removed 58 from the mold apparatus. The mounting faces 14 and the central aperture 18 are cut 60 from the drum body 12. The braking surface 28 of the brake drum 10 is machined 62 along with the plurality of fastener apertures 16 a.k.a. lug bolt holes. This is conventional and known in the art.

Next, the brake drum 10 is balanced 64. This may also be referred to as a final balance. In this step, the brake drum is checked for any eccentricities. If any eccentricity is located, the amount of the eccentricity is determined. The eccentricity is removed by machining the balancing skirt, also known as "flattening out" the brake drum. Techniques to remove the eccentricity include but are not limited to cutting or mill machining. Any other suitable known techniques may be used to final balance the brake drum 10.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A composite brake drum for use in a drum brake assembly comprising:

a mounting face having a plurality of fastener apertures;

a shoulder radially extending from said mounting face;

a cylindrical section formed from a first material, extending from said shoulder and having a radially outer surface;

an annular band bonded to radially outer surface of said cylindrical section, said band being formed from a second material and having a radially outer surface; and a skirt formed from the first material, extending from said cylindrical section, and along a portion of said radially outer surface of said annular band, for providing material which can be removed to balance the brake drum.

2. A composite brake drum as defined in claim 1, wherein said shoulder is bonded to said annular band.

3. A composite brake drum as defined in claim 2, wherein said cylindrical section and said shoulder are bonded to said annular band by static casting.

4. A composite brake drum as defined in claim 1 wherein said cylindrical section, said shoulder, and said skirt are bonded to said annular band.

5. A composite brake drum as defined in claim 1, wherein said shoulder includes an inside surface having a plurality of fins mounted to said inside surface of said shoulder.

6. A composite brake drum as defined in claim 1, wherein said first material is gray iron.

7. A composite brake drum as defined in claim 1, wherein said second material is steel.

8. A composite brake drum as defined in claim 1, wherein said annular band further includes a plurality of strengthening ribs.

9. A composite brake drum as defined in claim 1, wherein said annular band further includes a first peripheral edge enclosed by said skirt.

10. A composite brake drum as defined in claim 1, wherein said skirt encircles a portion of said radially outer surface of said band.

11. A composite brake drum as defined in claim 1, wherein said skirt intermittently encircles a portion of said annular band.

12. A composite brake drum as defined in claim 1, wherein said mounting face and said shoulder are constructed from said first material.

13. A composite brake drum as defined in claim 1, wherein said mounting face and said shoulder are constructed from said second material.

14. A composite brake drum as defined in claim 13, wherein said shoulder is integral to said annular band.

15. A composite brake drum for use in a drum brake assembly comprising:

a brake drum body formed from a first material having a cast mounting face, a cast shoulder extending from said mounting face, and a cast cylindrical section extending from said shoulder having a radially outer surface;

an annular band having a radially outer surface, formed from a second material, and bonded to the radially outer surface of said cylindrical section; and a skirt formed from said first material extending from said cylindrical section and along a portion of said radially outer surface of said annular band.

16. A composite brake drum as defined in claim 15, wherein said skirt is bonded to said annular band.

17. A composite brake drum for use in a drum brake assembly comprising:

a mounting face having a plurality of fastener apertures;

a shoulder radially extending from said mounting face;

a cylindrical section formed from a first material, said cylindrical section extending from said shoulder and having a radially outer surface;

an annular band having a radially outer surface, said annular band being formed from a second material and bonded to the radially outer surface of said cylindrical section; and a skirt formed from the first material, said skirt extending from said cylindrical section and along a portion of said radially outer surface of said annular band, whereby said mounting face and said shoulder are constructed from said second material.

* * * * *